US 8,406,528 B1

United States Patent
Hatwich

(10) Patent No.: US 8,406,528 B1
(45) Date of Patent: Mar. 26, 2013

(54) METHODS AND APPARATUSES FOR EVALUATING VISUAL ACCESSIBILITY OF DISPLAYABLE WEB BASED CONTENT AND/OR OTHER DIGITAL IMAGES

(75) Inventor: Joshua A. Hatwich, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 791 days.

(21) Appl. No.: 12/573,718

(22) Filed: Oct. 5, 2009

(51) Int. Cl.
*G06K 9/48* (2006.01)
*G06K 9/34* (2006.01)

(52) U.S. Cl. ............... 382/199; 382/177; 382/164

(58) Field of Classification Search .......... 382/190, 382/199, 177, 164
See application file for complete search history.

(56) References Cited

U.S. PATENT DOCUMENTS 6,731,788 B1 * 5/2004 Agnihotri et al. ............ 382/157
8,144,979 B2 * 3/2012 Kuo ............................ 382/164

OTHER PUBLICATIONS http://wave.webaim.org, WAVE—Web Accessibility Evaluation Tool, 2009, 5 pages, obtained on Oct. 5, 2009.
http://addons.mozilla.org/en-US/firefox/addon/7391, WCAG Contrast checker: Add-ons for Firefox, 2005, 4 pages, obtained on Oct. 5, 2009.
http://www.paciellogroup.com/resources/contrast-analyser.html, Resource Center—Contrast Analyser 2.2, 6 pages, obtained on Oct. 5, 2009.
http://www.docstoc.com/docs/3438687/Dreamweaver-MX-User-Guide-PDF-of-Accessibil ... , Dreamweaver MX User Guide PDF of Accessibility Quick Note Throughout, 2004, 4 pages, obtained Oct. 5, 2009.

* cited by examiner

*Primary Examiner* — Kathleen Y Dulaney
(74) *Attorney, Agent, or Firm* — Wolfe-SBMC

(57) ABSTRACT

Methods and apparatuses are provided which may be implemented to in various electronic devices to evaluate displayable digital images based on certain test criterion. The displayable images may represent web content and/or the like, and the test criterion may include or relate to desired user experience and/or other like content accessibility measures.

15 Claims, 4 Drawing Sheets

METHODS AND APPARATUSES FOR EVALUATING VISUAL ACCESSIBILITY OF DISPLAYABLE WEB BASED CONTENT AND/OR OTHER DIGITAL IMAGES

BACKGROUND

1. Field

The subject matter disclosed herein relates to data processing, and more particularly to methods and apparatuses for evaluating certain visual aspects of displayable content and/or other like digital imagery.

2. Information

There are a variety of different electronic devices in use today which allow users to access and view information. For example, various computing devices and/or other like communication devices may be used to access information from other devices via a communication network. For example, the Internet, and in particular the World Wide Web, provides an incredible environment in which information may be shared between users. Here, for example, browsers and/or other like applications may be used to obtain web pages or other like web based content which may then be processed (e.g., rendered) and displayed to a user via some type of display device.

To provide a desired user experience when viewing and/or interacting with such displayed content, certain guidelines may be developed. Such guidelines may, for example, be developed in attempt to maximize accessibility for certain users. For example, a guideline or possibly design requirement may be provided with the intention of meeting certain user vision needs.

Testing content to determine whether such guidelines have been satisfied may be tedious or otherwise difficult given the varying types of content available and/or display devices in use. Thus, for these reasons and others, content developers, providers and/or others may benefit from having some form of automated mechanism to efficiently process and evaluate such content.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects, methods and apparatuses are provided which may be implemented in various electronic and/or other like computing devices to support evaluation of web page's or other like data file's design and/or content as it might be rendered and displayed on a display device. For example, in certain implementations, a web page may be rendered to form a digital image file all or portions of which may be tested with regard to certain test criteria to determine if the web page may support a desired user experience upon viewing. By way of example, certain test criteria may be provided to enhance or otherwise support user accessibility, and in particular examples to provide a desired experience for users with certain needs. For example, certain test criteria may specify one or more desired visual characteristics, such as desired contrast levels, color schemes, font sizes, font types, and/or the like, for textual content as displayed.

Thus, for example, in certain example implementations one or more electronic devices may be enabled with an automated or other like process to obtain a digital image and identify test regions therein, apply certain text criteria to the test regions, and generate test results. The test results may, for example, be presented visually using one or more test indicators along with at least a portion of the digital image. Consequently, a web page developer or other like content author/provider may test certain products quickly and efficiently. Here, for example, certain test criteria may be associated with an industry and/or other like established set of content accessibility principles, guidelines and/or standards.

By way of example but not limitation, certain test criteria may be associated with or otherwise be derived from certain guidelines in Web Content Accessibility Guidelines (WCAG) 2.0 developed by the WCAG Working Group associated with the World Wide Web Consortium (W3C). Here, for example, such guidelines may specify certain desired levels of contrast for textual content.

Figure 1:
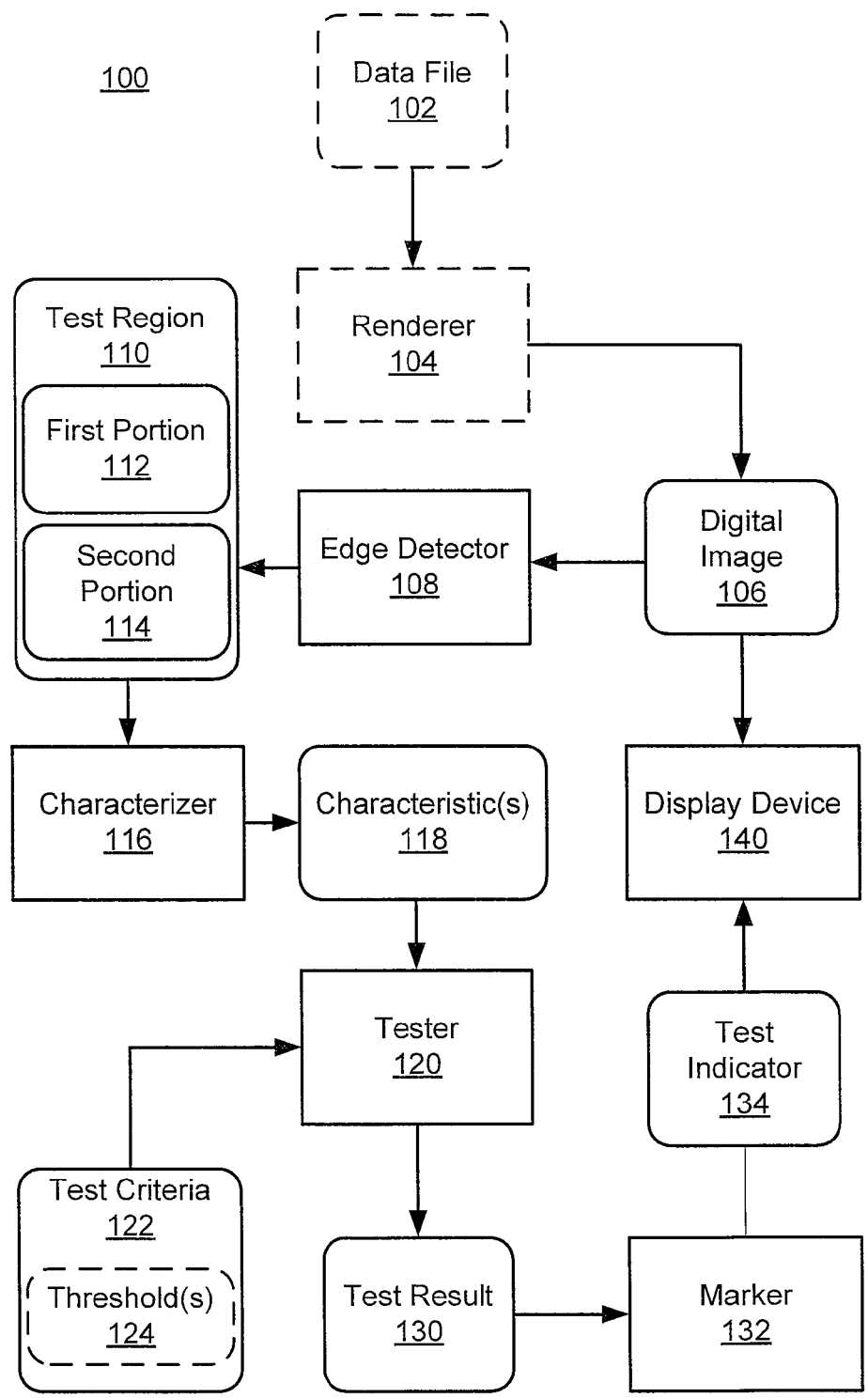
FIG. 1 is a block diagram illustrating an exemplary process for evaluating certain visual aspects of displayable content and/or other like digital imagery, in accordance with certain implementations.

Reference is now made to FIG. 1, which is a functional block diagram illustrating an example process 100 that may be implemented in one or more electronic devices to test a digital image.

Process 100 may include obtaining a digital image 106. Here, for example, one or more data files 102 may be accessed or otherwise obtained and processed using a renderer 104 or other like capability to establish digital image 106 in a form for display via a display device 140. Data file 102 may represent any form or information that may be processed to establish digital image 106. Digital image 106 may include, for example, pixel information defining a plurality of pixels arranged in a two-dimensional array. While pixel information may vary depending on the intended display device, such pixel information will likely specify one or more values relating to one or more colors to the displayed. Such techniques and information are well known.

Digital image 106 may be processed using an edge detector 108 or other like capability to identify one or more test regions 110 therein. A test region 110 may include, for example, two or more pixels of digital image 106. As illustrated in this example, a test region 110 may include a first portion 112 and an adjacent second portion 114 of digital image 106. In certain implementations, for example, first portion 112 may be associated with a boundary of at least one textual character and second portion 114 may be associated with a background that is adjacent to said textual character. In some examples, first portion 112 and/or second portion 114 may include a single pixel. In some examples, first portion 112 and/or second portion 114 may include a plurality of pixels.

A test region 110 may be processed using a characterizer 116 or other like capability to identify one or more characteristics 118 of the test region. Here, for example, characterizer 116 may be enabled to determine a contrast ratio for test region 110. For example, a contrast ratio may be determined based, at least in part, on pixel information associated with first portion 112 and/or second portion 114. Characterizer 116 may be enabled, for example, to determine one or more characteristics associated with one or more specific colors of test region 110. For example, certain color-blindness or other like color-based characteristics may be determined based, at least in part, on pixel information associated with first portion 112 and/or second portion 114.

Characteristics 118 may be processed using a tester 120 or other like capability to determine one or more test results 130. Tester 120 may, for example, implement one or more processes which evaluate characteristics 118 based, at least in part, on one or more test criteria 122. For example, test criteria 122 may include one or more thresholds 124. By way of example, in some implementations, tester 120 may implement a comparison process which compares at least one image characteristic associated with test region 110 to one or more test criteria 122. Here, for example, at least one image characteristic may include a contrast ratio associated with first potion 112 and second portion 114, and test criteria 122 may include a contrast ratio threshold 124. In some implementations, one or more thresholds 124 may be selected or otherwise established based, at least in part, on one or more characteristics 118. For example, a contrast ratio threshold may be selected based on a determined or otherwise identified textual size. For example, a color-blindness or other like color-based threshold may be selected based on a user specified or otherwise identified color choice.

Tester 120 may establish one or more test results 130 for one or more test regions. A test result 130 may vary depending on the test or tests conducted. In certain example implementations, a test result 130 may specify that a test region 110 either passed or failed a given test. Here, for example, one or more pixels of digital image 106 may be flagged or otherwise indicated as passing and/or failing a given test. In other example implementations, test results 130 may include additional and/or other information resulting from a given test. Here, for example, a test score or other like information may be provided for one or more pixels in digital image 106.

In certain implementations, test results 130 may be provided to one or more other processes and/or devices for further use, and/or otherwise presented to a user in a non-graphical manner. For example, test results 130 may be provided to a web developer application and/or other like content production tool and/or appliance for further processing/consideration. For example, test results 130 may be stored in a data file, and/or displayed as a numerical listing, etc., that user may examine.

In other implementations, for example, test results 130 may be further processed using a marker 132 or other like capability to generate at least one test indicator 134 that may be displayed on display device 140. Here, for example, test indicator 134 may include digital image data that may be displayed in some manner with at least a portion of digital image 106. For example, test indicator 134 may include digital image data that may be displayed as visually overlaying and/or otherwise visually altering the display of at least a corresponding test region. Thus, for example, if a test region 110 failed (or passed) a given test then test indicator 134 may visually communicate such failure (or passage) through display device 140. Some non-limiting examples may include, static and/or dynamic color or brightness changes which when viewed by a user illustrate failing (or passing) test regions 110. I certain implementations, test indicator 134 may include additional information relating to test results 130. For example, multiple different colors or brightness settings may be used to convey test results that are not simply pass or fail. For example, in certain implementations, test indicator 134 may include detailed test results in the form of readable content. Here, for example, one or more scores or other like content may be displayed directly and/or selectively (e.g., user input may activate display, open menus, tables, etc.).

Figure 2:
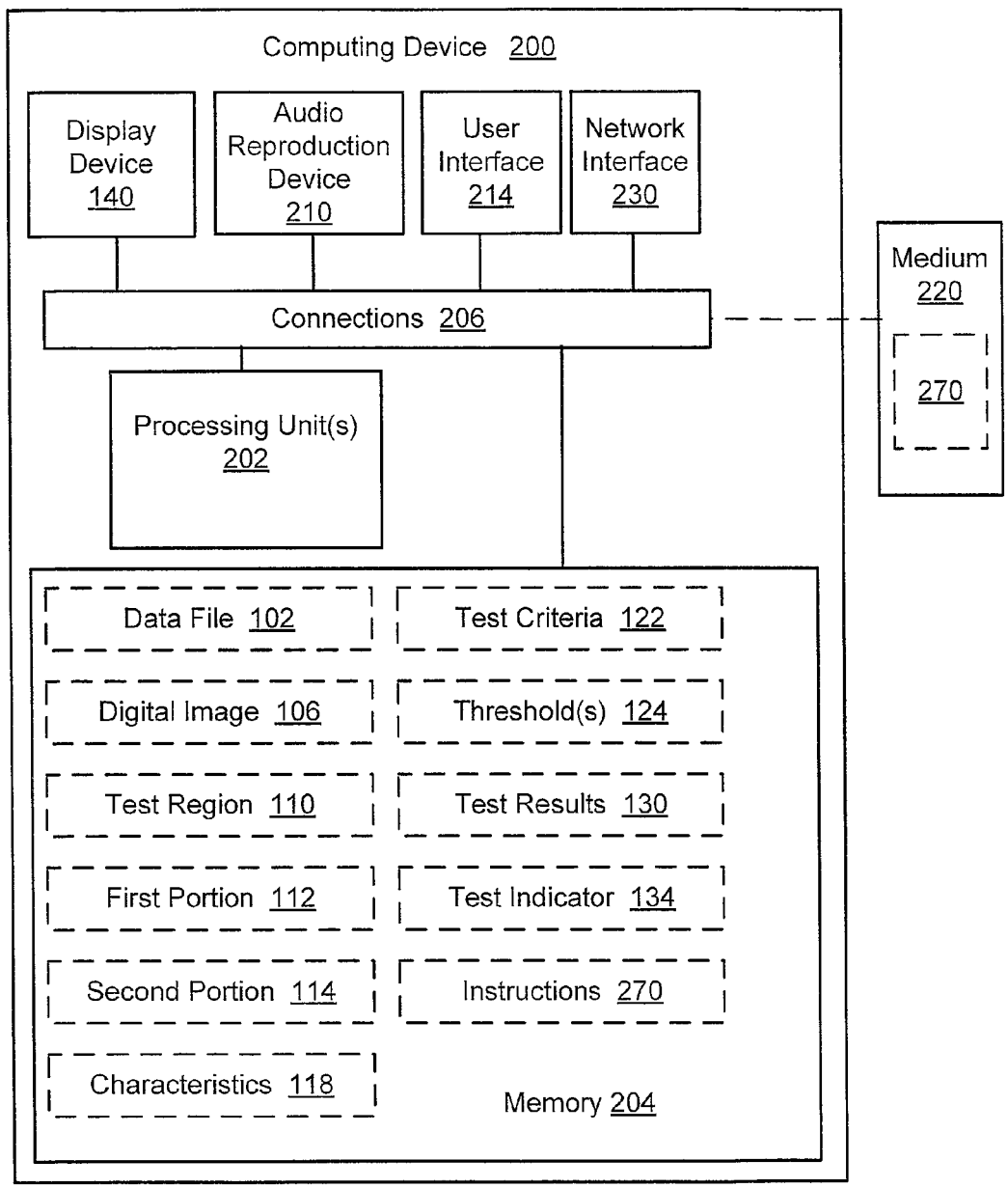
FIG. 2 is a schematic diagram illustrating an exemplary computing device for use in evaluating certain visual aspects of displayable content and/or other like digital imagery, in accordance with certain implementations.

Attention is drawn next to FIG. 2, which is a schematic block diagram illustrating certain example functions, components and information that may be provided in a computing device 200 that may serve as an electronic device in which all or portions of process 100 (FIG. 1) may be implemented.

Computing device 200 may comprise one or more processing units 202 operatively coupled to memory 204 through one or more connections 206 (e.g., lines, conductors, fibers, buses, etc.). Here, for example, a processing unit 202 may comprise a microprocessor, micro controller, ASIC, and/or the like. Memory 204 may, for example, comprise a primary memory having a computer readable medium in the form of solid state circuitry such as a random access memory, a read only memory, etc. Memory 204 may, for example, comprise a secondary memory having a computer readable medium 220 on which data may be stored magnetically and/or optically, such as, additional solid state memory, a disk drive, an optical disc, a tape, etc.

In certain example implementations, an article of manufacture may comprise a computer readable medium 220 that may be included with and/or otherwise accessed by computing device 200. Computer readable medium 220 have one or more computer implementable instructions 270 stored thereon that in response to being executed by one or more processing units 202 operatively enable computing device 200 to implement all or potions of process 100. As illustrated, all or part of computer implementable instructions 270 may, for example, be stored in memory 204.

Memory 204 may also store, at times, information in the form of data and/or instructions associated with process 100. For example, memory 204 may store one or more digital signals representing data file 102, digital image 106, test region 110, first portion 112, second portion 114, characteristic(s) 118, test criteria 122, threshold(s) 124, test results 130, and/or test indicator 134.

As illustrated in the example of FIG. 2, connections 206 may also couple processing unit 202 and/or memory 204 to a display device 140, an (optional) audio reproduction device 210, a user interface 214, and (optional) a network interface 230.

Here, for example, display device 140 is representative of any display device and/or other like circuitry operatively enabled to present visual information that may be seen by a user. By way of example but not limitation, display device 140 may include a display interface circuit coupled to a flat panel screen, cathode ray tube, projector, touch-screen, and/or other like display.

Audio reproduction device 210 is representative of any audio reproduction device and/or other like circuitry operatively enabled to present audio information that may be heard by a user. By way of example but not limitation, audio reproduction device 210 may include a sound interface circuit coupled to an amplifier and/or one or more speakers, headphones, etc.

User interface 214 is representative of any user interface circuitry and/or mechanism through which a user may selectively input information operatively associated with at least presentation display interface 120. By way of example but not limitation, user interface 214 may include one or more device interface circuits to enable user input via a keyboard, keypad, mouse or other like pointing/selection device, microphone, camera, etc.

Network interface 230 is representative of one or more wired and/or wireless network interface circuits. By way of example but not limitation, network interface 230 may include circuitry comprising one or more of a modem, a transceiver, a cable, a fiber, an antenna, etc., as may be employed to communicate through communication network 102.

Figure 3:
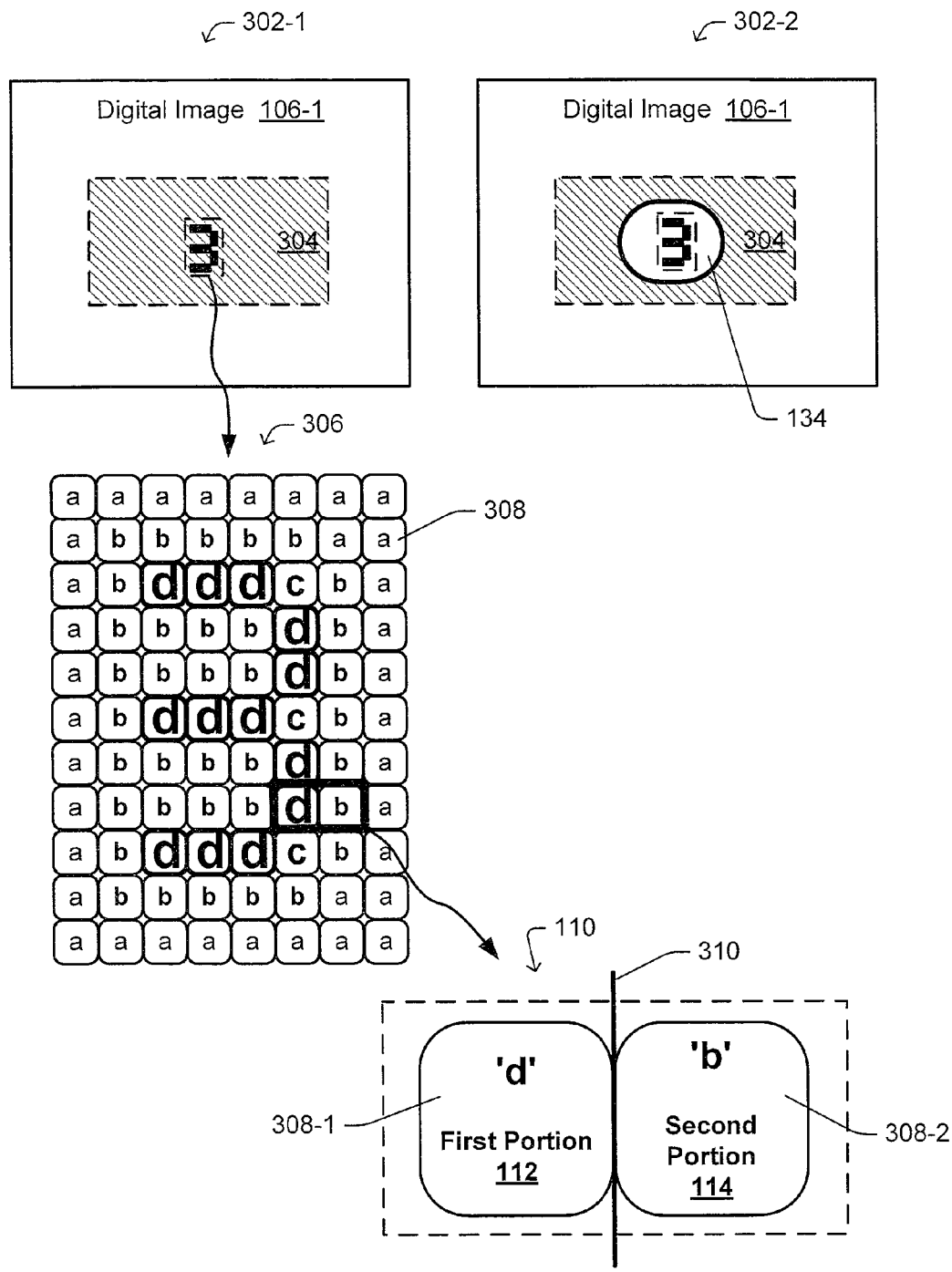
FIG. 3 is an illustrative depiction showing certain visual aspects of displayable content and/or other like digital imagery that may be for evaluated, for example, using a process as in FIG. 1, in accordance with certain implementations.

Reference will now be made to FIG. 3, which is an illustrative diagram showing certain aspects of a digital image as might be tested via example process 100 (FIG. 1).

Here, an initial display 302-1 shows a digital image 106-1 having a section 304 with textual content 306 displayed therein. Here, for example, textual content 306 includes a number "3" which is illustrated in magnification as comprising a plurality of specifically controlled pixels 308. In this basic example, the pixels are marked as having different characteristics as represented by the letters "a", "b", "c", and "d". Here, for example, the "d-pixels" form the main shape of the number "3", adjacent "c-pixels" and/or "b-pixels" appear at or near a boundary of the number "3", and "a-pixels" represent a background or other like surrounding image.

Using edge detector 108 (FIG. 1), for example, a test region 110 may be identified as shown in still greater magnification in FIG. 3 as having a "d-pixel" 308-1 in first portion 112 and having a "b-pixel" 308-2 in second portion 114, having determined that an edge 310 of the number "3" exists at such position.

A subsequent display 302-2 illustrates an example of digital image 106-1 with a graphical test indicator 134 arranged to communicate to a user one or more test results.

Figure 4:
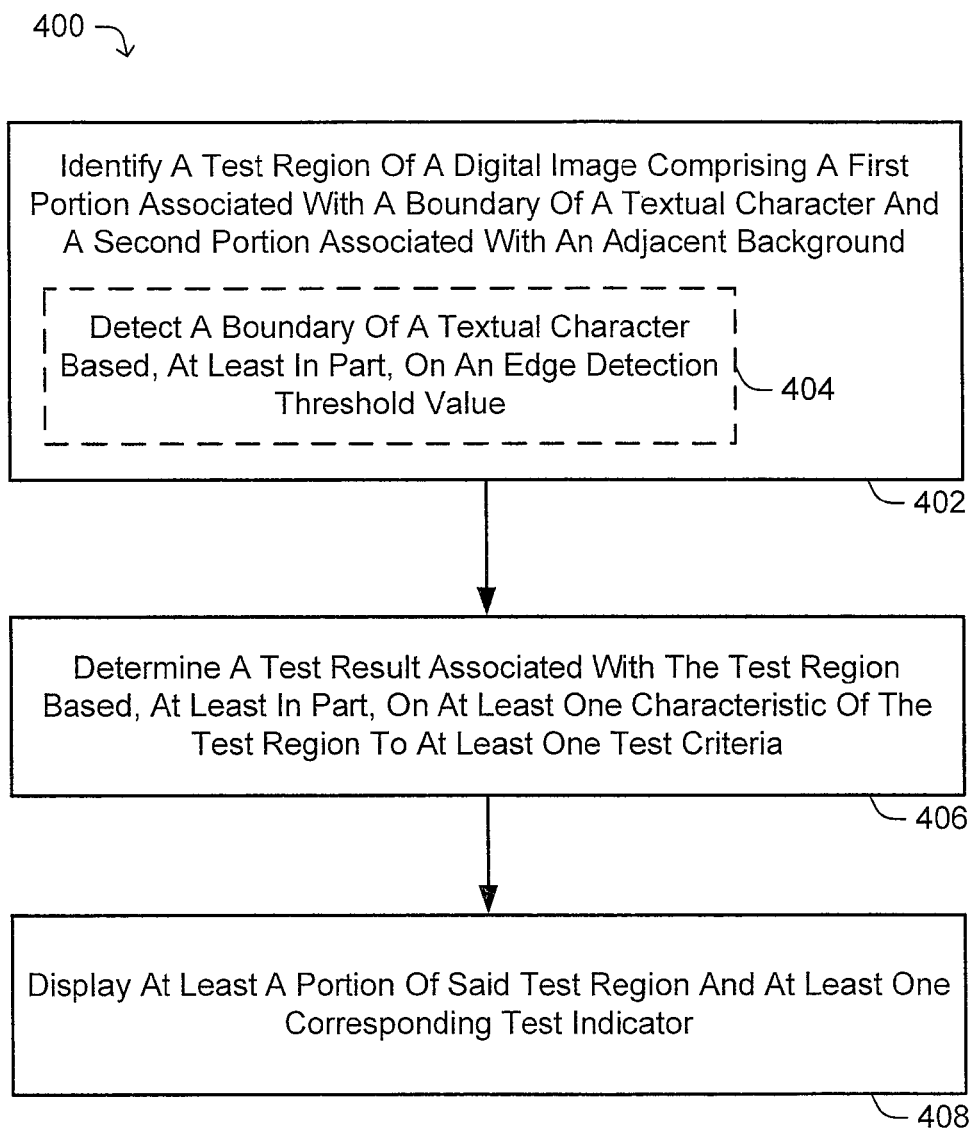
FIG. 4 is a flow diagram illustrating an exemplary process for evaluating certain visual aspects of displayable content and/or other like digital imagery, in accordance with certain implementations.

Attention is drawn next to FIG. 4, which is a flow-diagram illustrating an example process 400 that may be implemented an electronic device, such as, computing device 200 in FIG. 2, and/or the like. Like process 100 of FIG. 1, process 400 may be employed to process digital image 106-1 and to produce a subsequent display 302-2, e.g., as illustrated in FIG. 3.

At block 402, at least one test region of a digital image may be identified. The test region may include at least a first portion associated with a boundary of a textual character and a second portion associated with an adjacent background.

In certain further implementations, at block 404 shown here in block 402, a boundary of textual character may be detected based, at least in part, on at least one edge detection threshold value. By way of example, a boundary of textual character may be detected by determining edge values for pairs of adjacent pixels within a digital image, comparing edge values to an edge detection threshold value to identify edge candidate pixel pairs, identifying a plurality of adjacent edge candidate pixel pairs as an edge of a textual character, and specifying one of the plurality of adjacent edge candidate pixel pairs as a test region. Thus, in this example, first and second portions of such a test region may comprise first and second pixels of a specified edge candidate pixel pair, respectively. In certain example implementations, identifying a test region may comprise detecting a size of at least one textual character.

At block 406, at least one test result associated with the test region or at least part of the test region may be determined based, at least in part, on at least one characteristic of the test region or at least part of the test region, and one or more test criteria. By way of example, test criteria may consider one or more thresholds. For example, in certain implementations at least one image characteristic may comprise a contrast ratio and test criteria may comprises a contrast ratio threshold. In certain implementations, a threshold may include a value. In certain other implementations, test criteria may comprise one or more functions and/or other like data processing algorithms, which may establish one or more threshold values, and/or otherwise apply logical constraints as part of a testing process. In certain implementations, one or more test criteria may be selected based, at least in part, on a size (e.g., detected size) of a textual character.

At block 408, at least part of the test region and at least one corresponding test indicator may be displayed. Here, for example, a test indicator may be based, at least in part, on said test result and may comprise digital image data that visually overlays and/or otherwise operatively/interactively corresponds to one or more test regions.

An example implementation is described below, and as with all other examples presented and/or illustrated herein is not intended to limit the scope of claimed subject matter. In the following example, process 100 (FIG. 1) is implemented to support a contrast evaluation process based on some WCAG 2—guidelines. In the following example, first portion 112 comprises a foreground pixel and second portion 114 comprises a background pixel. Here, in this example, for a given pixel its pixel information specifies red, green and blue (RGB) colors. For example, each of the colors may be specified using an eight-bit color value scaled between 0.0 and 1.0.

With regard to example process 100, edge detector 106 may calculate a luminance value (L2) for the foreground pixel and a luminance value (L1) for a background pixel based on such pixel information; for example using:

$L=0.2126*R+0.7152*G+0.0722*B$ where, for example, R, G and B may be determined using:
if (pixel.r≦0.03928)
R=pixel.r/12.92
else
$R=((pixel.r+0.055)/1.055)^{2.4}$
if (pixel.g<=0.03928)
G=pixel.g/12.92
else
$G=((pixel.g+0.055)/1.055)^{2.4}$
if (pixel.b<=0.03928)
B=pixel.b/12.92
else
$B=((pixel.b+0.055)/1.055)^{2.4}$ where pixel.r, pixel.g, and pixel.b represent eight-bit colors scaled between 0.0 and 1.0.

Characterizer 116 may determine a contrast ratio, for example, using:
if (L2>L1)
temp=L2
L2=L1
L1=temp
Contrast Ratio=(L1+0.05)/(L2+0.05)

Tester 120 may evaluate a contrast ratio against one or more test criteria (here, e.g., WCAG2 guidelines). For example, current WCAG2—Guideline 1.4.3—specifies that a desired (minimum) contrast ratio for text and images of text with size less than 18 pt (normal) or 14 pt (bold) of at least 5:1. For such text and images of text with size equal to or greater than 18 pt (normal) or 14 pt (bold), a contrast ratio of at least 3:1 is desired. Similarly, current WCAG2—Guideline 1.4.5—specifies desired (enhanced) contrast ratios, of 7:1 and 5:1 respectively. Such ratios and/or the like may be provided as test criteria 122 and/or thresholds 124, for example.

Edge detector 108 may, for example, be enabled to detect edges in this example implementation by finding and isolating edges in digital image 106. For example, edge detector 108 may desaturate all or part of digital image 106 and apply a convolution matrix to a pixel pair (pixelX, pixelY), such as:

for pixelX
-1, 0, 1
-2, 0, 2
-1, 0, 1
and
for pixelY
1, 2, 1
0, 0, 0
-1, -2, -1

For example, edge detector 108 may then add the results, such that:

pixel=abs(pixelX)+abs(pixelY)
if pixel>a threshold value then the pixel in the digital image may be an edge candidate it, otherwise it may be ignored Edge detector 108 may then compare such edge candidates, for example, along various possible directions in relationship to the pixel array of the digital image. Here, for example, an edge may be deemed to exist if a plurality of edge candidates are determined to be arranged along vertical, horizontal, diagonal, and/or other like directions.

In certain implementations, such directions/arrangements may be associated with straight lines. In certain implementations, such directions/arrangements may be associated with curved lines and/or other specific shapes. In certain implementations, such directions/arrangements may take into account certain text character shapes, fonts, languages, etc., that may help identify edges/boundaries. In certain implementations, statistical/probabilistic techniques may be implemented to help identify edges/boundaries. In certain implementations, other information associated with digital image 106 may be considered to help identify edges/boundaries, textual characters, sizes, styles, formats, etc. Here, for example, certain metadata may be considered. Here, for example, other information and/or data available in related data file 102 may be considered.

Tester 120 may, in this example, generate test results 130 by comparing contrast ratios of test region 110 along an edge with test criteria 122. For example, test results 130 may indicate whether a test region 110 satisfies WCAG2—Guideline 1.4.3, and/or WCAG2—Guideline 1.4.5. Such comparison and test results may, for example, take into account a determined font size and/or format. In other implementations, certain assumptions with regard to the size and/or format of textual characters may be made.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising: with at least one electronic device:
obtaining one or more electronic signals representing a digital image rendered for display on a display device;
identifying at least one test region of said digital image, said test region comprising a first portion associated with a boundary of at least one textual character, and at least a second portion associated with a background adjacent to said at least one textual character, wherein said identifying the at least one test region comprises detecting the boundary based, at least in part, on an edge detection threshold value, including:
determining edge values for pairs of adjacent pixels within the digital image;
comparing each of the edge values to the edge detection threshold value to identify edge candidate pixel pairs;
identifying a plurality of adjacent edge candidate pixel pairs as an edge of the at least one textual character; and
specifying one or more of the plurality of adjacent edge candidate pixel pairs as the test region, wherein the first and second portions of the test region comprise respective first and second pixels of the specified one or more edge candidate pixel pairs;
generating one or more digital signals representing a test result associated with said test region based, at least in part, on a comparison of at least one image characteristic associated with said test region to one or more test criteria; and
initiating display of at least a portion of said test region and at least one corresponding test indicator, said test indicator being based, at least in part, on said test result and comprising one or more electronic signals representing digital image data.

2. The method as recited in claim 1, wherein said at least one image characteristic comprises a contrast ratio associated with said first and second portions, and said one or more test criteria are associated with at least one contrast ratio threshold.

3. The method as recited in claim 1, wherein, upon display, said digital image data visually overlays at least a portion of said test region.

4. The method as recited in claim 1, wherein said digital image data comprises pixel information selectively defining one or more color or brightness settings based, at least in part, on said test result.

5. The method as recited in claim 1, wherein said identifying said at least one test region further comprises detecting a size of said at least one textual character.

6. The method as recited in claim 1, wherein said one or more test criteria are selected based, at least in part, on a size of said at least one textual character.

7. An apparatus comprising:
memory;
a display device; and
at least one processing unit coupled to said memory and said display device and programmed with instructions to:
obtain a digital image from said memory, said digital image being rendered for display on said display device;
identify at least one test region of said digital image, said test region comprising a first portion associated with a boundary of at least one textual character, and at least a second portion associated with a background adjacent to said at least one textual character, wherein said identifying the at least one test region comprises detecting the boundary based, at least in part, on an edge detection threshold value, including:
determining edge values for pairs of adjacent pixels within the digital image;
comparing each of the edge values to the edge detection threshold value to identify edge candidate pixel pairs;
identifying a plurality of adjacent edge candidate pixel pairs as an edge of the at least one textual character; and
specifying one or more of the plurality of adjacent edge candidate pixel pairs as the test region, wherein the first and second portions of the test region comprise respective first and second pixels of the specified one or more edge candidate pixel pairs;
determine a test result associated with said test region based, at least in part, on a comparison at least one image characteristic associated with said test region to one or more test criteria; and
initiate display of at least a portion of said test region and at least one corresponding test indicator, said test indicator being based, at least in part, on said test result and comprising one or more electronic signals representing digital image data.

8. The apparatus as recited in claim 7, wherein said at least one image characteristic comprises a contrast ratio associated with said first and second portions, and said one or more test criteria is associated with at least one contrast ratio threshold.

9. The apparatus as recited in claim 7, wherein, upon display, said digital image data visually overlays at least a portion of said test region upon display.

10. The apparatus as recited in claim 7, wherein said digital image data comprises pixel information selectively defining one or more color or brightness settings based, at least in part, on said test result.

11. The apparatus as recited in claim 7, said at least one processing unit being further programmed with instructions to:
detect a size of said at least one textual character; and
select said one or more test criteria based, at least in part, on a size of said at least one textual character.

12. An article comprising:
a non-transitory computer readable storage medium having computer implementable instructions stored thereon that, in response to being executed by one or more processing units in an electronic device, enable the electronic device to:
obtain a digital image rendered for display on a display device;
identify at least one test region of said digital image, said test region comprising a first portion associated with a boundary of at least one textual character, and at least a second portion associated with a background adjacent to said at least one textual character, wherein said identifying the at least one test region comprises detecting the boundary based, at least in part, on an edge detection threshold value, including:
determining edge values for pairs of adjacent pixels within the digital image;

comparing each of the edge values to the edge detection threshold value to identify edge candidate pixel pairs;

identifying a plurality of adjacent edge candidate pixel pairs as an edge of the at least one textual character; and specifying one or more of the plurality of adjacent edge candidate pixel pairs as the test region, wherein the first and second portions of the test region comprise respective first and second pixels of the specified one or more edge candidate pixel pairs;

determine a test result associated with said test region based, at least in part, on a comparison at least one image characteristic associated with said test region to one or more test criteria; and initiate display of at least a portion of said test region and at least one corresponding test indicator, said test indicator being based, at least in part, on said test result and comprising one or more electronic signals representing digital image data.

13. The article as recited in claim 12, wherein said at least one image characteristic comprises a contrast ratio associated with said first and second portions, and said one or more test criteria is associated with at least one contrast ratio threshold.

14. The article as recited in claim 12, wherein, upon display, said digital image data visually overlays at least a portion of said test region upon display.

15. The article as recited in claim 14, wherein said digital image data comprises pixel information selectively defining one or more color or brightness settings based, at least in part, on said test result.

* * * * *

UNITED STATES PATENT AND TRADEMARK OFFICE
CERTIFICATE OF CORRECTION

PATENT NO. : 8,406,528 B1  
APPLICATION NO. : 12/573718  
DATED : March 26, 2013  
INVENTOR(S) : Joshua A. Hatwich Page 1 of 1

It is certified that error appears in the above-identified patent and that said Letters Patent is hereby corrected as shown below:

In the Claims:

Column 10, Line 25, insert -- of -- between "...comparison" and "at...", therefor.

Signed and Sealed this  
Tenth Day of September, 2013

Teresa Stanek Rea  
*Acting Director of the United States Patent and Trademark Office*